(12) United States Patent
Ettling et al.

(10) Patent No.: US 10,661,417 B2
(45) Date of Patent: May 26, 2020

(54) TOOLS FOR ROTATING FASTENERS, METHODS OF UTILIZING THE TOOLS, AND METHODS OF MANUFACTURING THE TOOLS

(71) Applicant: The Boeing Company, Chicago, IL (US)

(72) Inventors: Karl James Ettling, Ridgecrest, CA (US); Russell Pete Callahan, Ridgecrest, CA (US)

(73) Assignee: The Boeing Company, Chicago, IL (US)

(*) Notice: Subject to any disclaimer, the term of this patent is extended or adjusted under 35 U.S.C. 154(b) by 225 days.

(21) Appl. No.: 15/891,236

(22) Filed: Feb. 7, 2018

(65) Prior Publication Data
US 2019/0240818 A1 Aug. 8, 2019

(51) Int. Cl.
| | | |
|---|---|---|
| *B25B 23/10* | (2006.01) | |
| *B25B 21/00* | (2006.01) | |
| *B25B 23/142* | (2006.01) | |
| *B25G 1/00* | (2006.01) | |
| *B25B 13/50* | (2006.01) | |

(52) U.S. Cl.
CPC ........ *B25B 23/105* (2013.01); *B25B 13/5091* (2013.01); *B25B 21/002* (2013.01); *B25B 21/004* (2013.01); *B25B 23/1427* (2013.01); *B25G 1/00* (2013.01); *B23P 2700/01* (2013.01)

(58) Field of Classification Search
CPC ... B25B 23/105; B25B 23/1427; B25B 23/10; B25B 23/106; B25B 23/108; B25B 13/5091; B25B 13/48; B25B 13/06; B25B 13/50; B25B 21/002; B23P 2700/01; B25G 1/00
See application file for complete search history.

(56) References Cited

U.S. PATENT DOCUMENTS

| | | | | |
|---|---|---|---|---|
| 1,334,261 A | * | 3/1920 | Robus | B25B 13/06 |
| | | | | 81/124.2 |
| 1,335,386 A | * | 3/1920 | Nicholas | B25B 23/10 |
| | | | | 81/13 |
| 2,774,401 A | * | 12/1956 | Hallam | B25B 23/10 |
| | | | | 81/457 |

(Continued)

*Primary Examiner* — David B. Thomas
(74) *Attorney, Agent, or Firm* — DASCENZO Intellectual Property Law, P.C.

(57) ABSTRACT

Tools for rotating fasteners, methods of utilizing the tools, and methods of manufacturing the tools. The tools include a gripping region, a fastener receptacle, and an interlock structure. The gripping region is configured to be gripped by a user of the tool. The fastener receptacle is shaped to receive the fasteners and includes a fastener-receiving opening on a fastener-facing side of the tool. The fastener-facing side faces in a fastener-facing direction. The fastener-receiving opening is sized to permit the fastener to enter the fastener receptacle from the fastener-facing side of the tool. The interlock structure is configured to interlock with the fastener while the fastener is received within the fastener receptacle. The interlock structure also is configured to prevent motion of the tool away from the fastener in a fastener-opposed direction, which is opposed to the fastener-facing side of the tool, while the interlock region is interlocked with the fastener.

20 Claims, 7 Drawing Sheets

(56) References Cited

U.S. PATENT DOCUMENTS

| | | | | |
|---|---|---|---|---|
| 3,010,346 | A * | 11/1961 | Kulp | B25B 13/5091 81/124.2 |
| 3,379,231 | A * | 4/1968 | Gallo, Sr. | F16B 23/0061 81/455 |
| 4,007,768 | A * | 2/1977 | Matsushima | B25B 15/008 81/448 |
| 4,060,113 | A * | 11/1977 | Matsushima | B25B 15/005 81/125 |
| 4,539,872 | A * | 9/1985 | Bochman, Jr. | B25B 23/065 81/431 |
| 4,631,986 | A * | 12/1986 | Dillabough | B25B 11/00 204/225 |
| 5,203,240 | A * | 4/1993 | Sorter | B25B 13/02 81/124.2 |
| 5,507,209 | A * | 4/1996 | Allen | B25B 13/48 81/124.2 |
| 5,647,253 | A * | 7/1997 | Pozek | B25B 13/485 411/405 |
| 6,010,154 | A * | 1/2000 | Payne | B25B 13/48 279/904 |
| 6,089,396 | A * | 7/2000 | Pozek | B25B 13/485 220/251 |
| 6,282,989 | B1 * | 9/2001 | Sorter | B25B 13/48 81/124.2 |
| 6,360,634 | B1 * | 3/2002 | Leitch | B23B 31/006 81/124.2 |
| 6,626,068 | B2 * | 9/2003 | McKivigan | B25B 13/5091 81/124.2 |
| 6,739,219 | B1 * | 5/2004 | Cuevas | B25B 9/00 81/452 |
| 6,901,825 | B1 * | 6/2005 | Lebron | B25B 13/5091 81/124.2 |
| 7,448,300 | B2 * | 11/2008 | Barniak, Jr. | B25B 13/06 81/121.1 |
| 7,913,593 | B2 * | 3/2011 | Dahar | B25B 23/10 81/452 |
| 8,459,155 | B2 * | 6/2013 | Canizares, Jr. | A61B 17/862 411/407 |
| 8,984,992 | B2 * | 3/2015 | Newkirk | B25B 13/06 81/125 |
| 9,193,048 | B1 * | 11/2015 | Ellringer, II | B25G 1/08 |
| 9,211,637 | B1 * | 12/2015 | Hewitt | B25B 23/105 |
| 9,415,491 | B1 * | 8/2016 | Hewitt | B25B 23/105 |
| 9,452,516 | B2 * | 9/2016 | Alavi | B25B 23/108 |
| 9,770,815 | B2 * | 9/2017 | Scrivens | B25B 13/06 |
| 10,124,471 | B2 * | 11/2018 | Sturner | B25G 1/10 |
| 2008/0065259 | A1 * | 3/2008 | Dietrich | G05B 19/4099 700/182 |
| 2013/0219694 | A1 * | 8/2013 | Ovenshire | B25B 27/02 29/592.1 |
| 2019/0184530 | A1 * | 6/2019 | Lares | B25B 23/108 |

\* cited by examiner

TOOLS FOR ROTATING FASTENERS, METHODS OF UTILIZING THE TOOLS, AND METHODS OF MANUFACTURING THE TOOLS

FIELD

The present disclosure relates generally to tools for rotating fasteners, to methods of utilizing the tools, and/or to methods of manufacturing the tools, and more particularly to tools that are configured to interlock with the fasteners while rotating the fasteners.

BACKGROUND

Certain industries, such as the military supply industry and/or the aerospace industry, may utilize specialized fasteners to retain certain components. As an example, the aerospace industry may utilize an avionics swing bolt, which also may be referred to herein as a swing bolt, to retain avionics equipment boxes within aircraft. Swing bolts may be configured such that a tensile force must be applied to the swing bolt in order to disengage a fastener-locking structure of the swing bolt and permit loosening and/or removal of the swing bolt. In general, the swing bolts are designed to be loosened manually (i.e., by hand). In practice, it may be difficult to reach and/or hand-loosen swing bolts in certain installations. In addition, repeated tightening and/or loosening of a large number of swing bolts may cause repetitive stress and/or ergonomic issues. Thus, there exists a need for improved tools for rotating fasteners, for improved methods of utilizing the tools, and/or for improved methods of manufacturing the tools.

SUMMARY

Tools for rotating fasteners, methods of utilizing the tools, and methods of manufacturing the tools are disclosed herein. The tools include a gripping region, a fastener receptacle, and an interlock structure. The gripping region is configured to be gripped by a user of the tool. The fastener receptacle is shaped to receive the fasteners and includes a fastener-receiving opening on a fastener-facing side of the tool. The fastener-facing side faces in a fastener-facing direction. The fastener-receiving opening is sized to permit the fastener to enter the fastener receptacle from the fastener-facing side of the tool. The interlock structure is configured to interlock with the fastener while the fastener is received within the fastener receptacle. The interlock structure also is configured to prevent motion of the tool away from the fastener in a fastener-opposed direction, which is opposed to the fastener-facing side of the tool, while the interlock region is interlocked with the fastener.

The methods include methods of utilizing the tool. These methods include positioning the fastener within the fastener receptacle and interlocking the interlock structure with the fastener. These methods also include applying a tensile force to the tool to disengage a locking structure of the fastener and, during application of the tensile force, rotating the tool about an axis of rotation.

The methods also include methods of forming the tool. These methods include utilizing an additive manufacturing process to form at least the gripping region, the fastener receptacle, and the interlock structure of the tool.

DESCRIPTION

Figure 1:
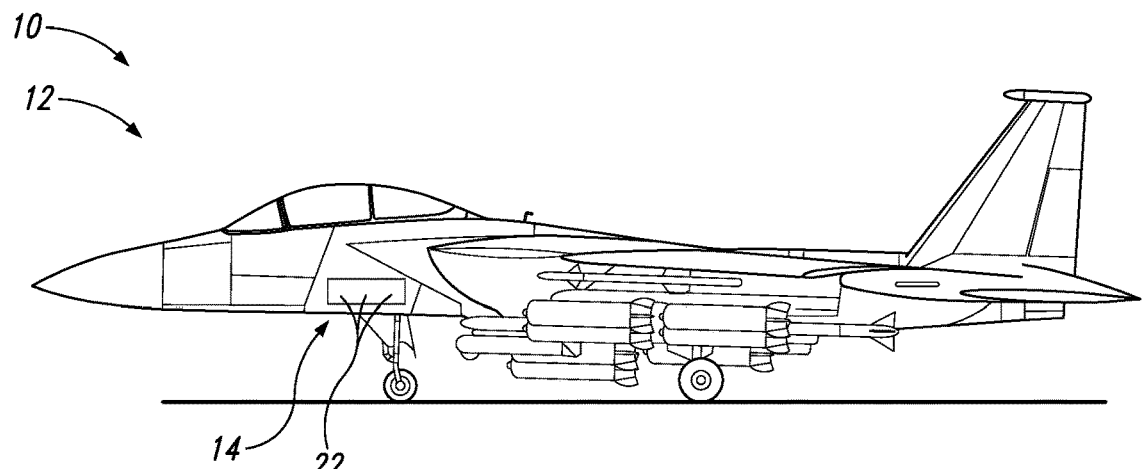
FIG. 1 is a schematic illustration of a vehicle, such as an aircraft, that may include fasteners configured to be rotating utilizing the tools and methods, according to the present disclosure.

FIGS. 1-11 provide illustrative, non-exclusive examples of a tool 100, of methods 200, and/or of methods 250, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
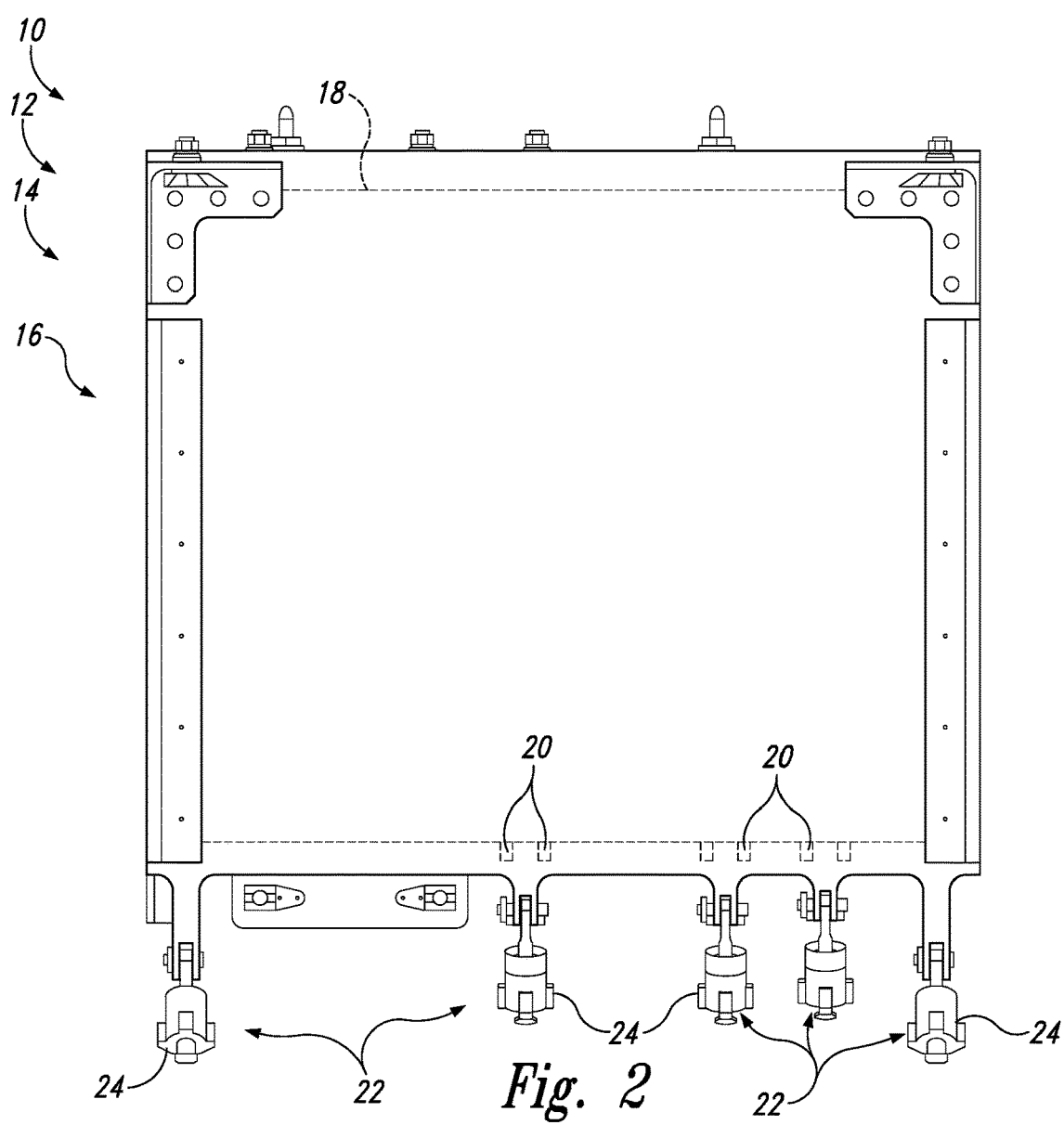
FIG. 2 is a schematic illustration of an equipment bay of the vehicle of FIG. 1.

FIG. 1 is a schematic illustration of a vehicle 10, such as an aircraft 12, that may include fasteners 22 configured to be rotating, utilizing the tool and methods according to the present disclosure. FIG. 2 is a schematic illustration of an equipment bay 14 of vehicle 10 of FIG. 1. As illustrated collectively by FIGS. 1-2, equipment bays 14 of vehicles 10 may include an equipment mounting plate 16. Equipment bays 14 and/or mounting plates 16 contained therein may be configured to house, to contain, to mount, and/or to be operatively attached to equipment 18 that includes tabs, or mounting tabs, 20. Tabs 20 may be configured to be engaged by fasteners 22, such as swing bolts 24, to operatively attach equipment 18 to equipment mounting plate 16.

As discussed in more detail herein, fasteners 22 may be configured such that a tensile force must be applied to the fastener to permit and/or facilitate loosening of the fastener, such as to permit and/or facilitate removal and/or installation of equipment 18 from equipment bay 14. Tools 100, which are discussed in more detail herein with reference to FIGS.

3-11, are configured to permit and/or facilitate faster and/or more ergonomically friendly tightening and/or loosening of fasteners 22.

Figure 3:
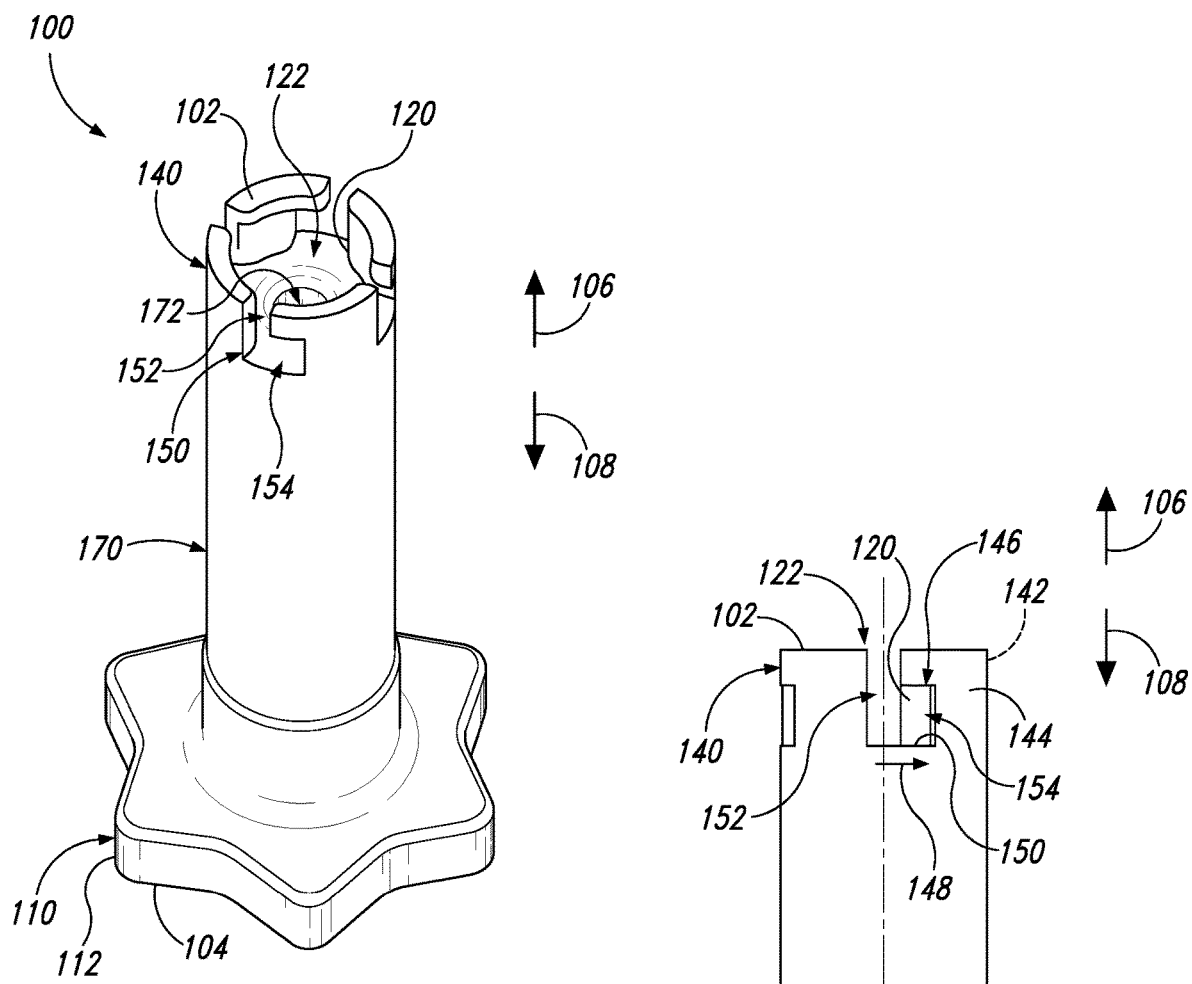
FIG. 3 is a profile view of an example of a tool, according to the present disclosure.
Figure 4:
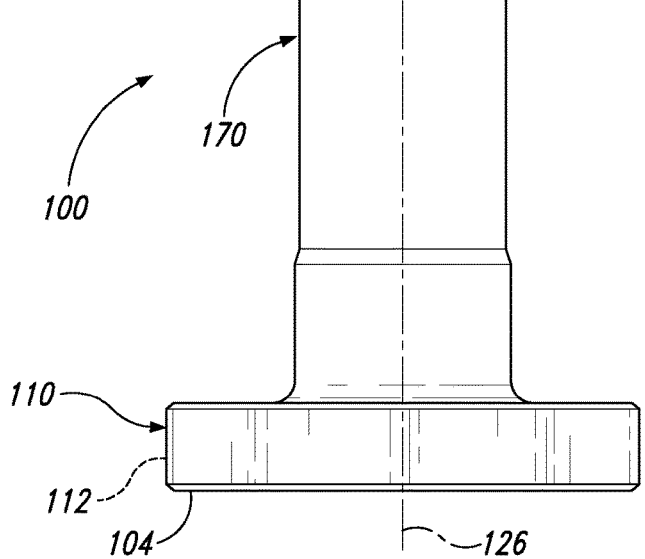
FIG. 4 is a side view of the tool of FIG. 3.
Figure 5:
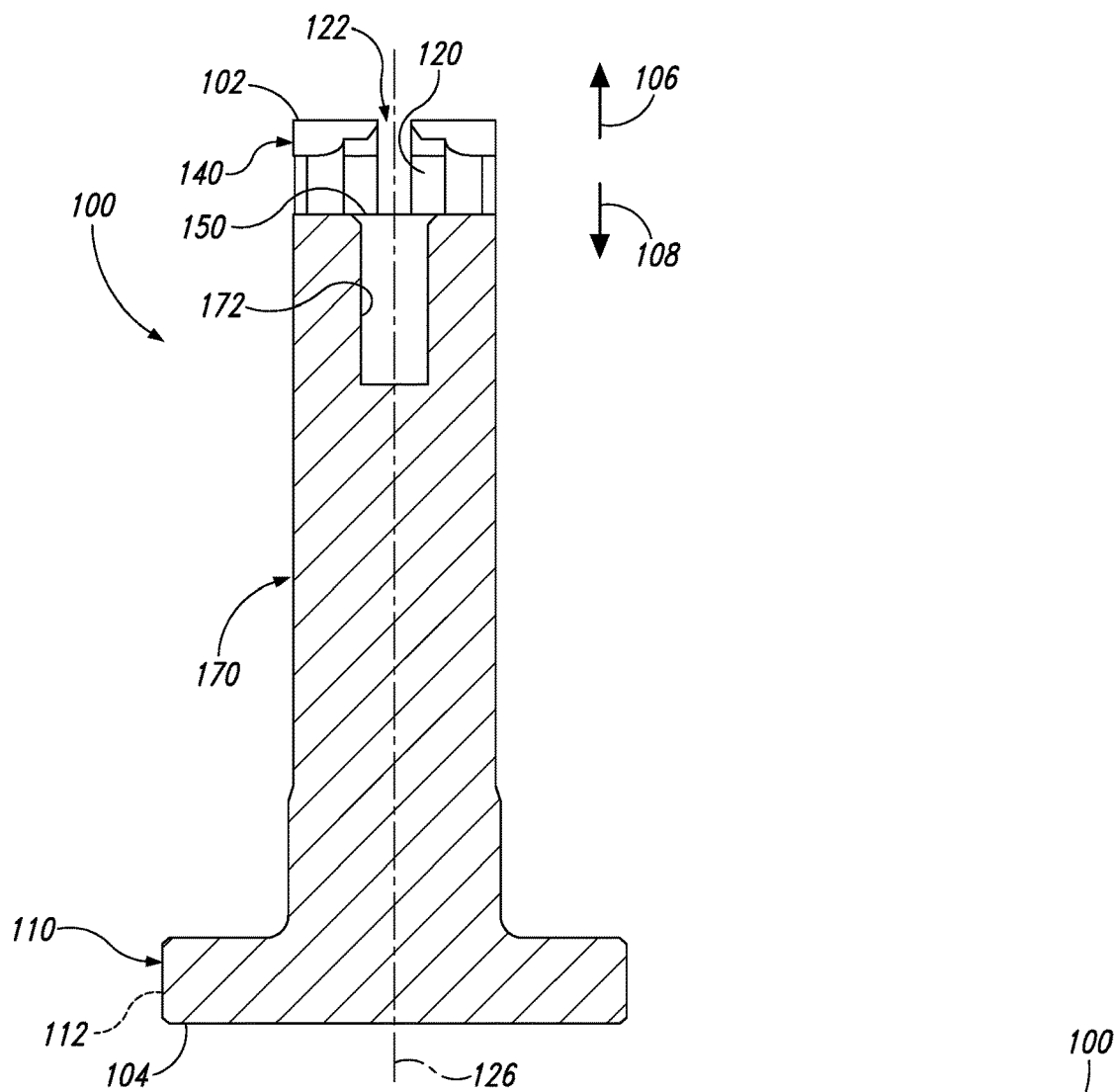
FIG. 5 is a cross-sectional view of the tool of FIGS. 3-4.
Figure 6:
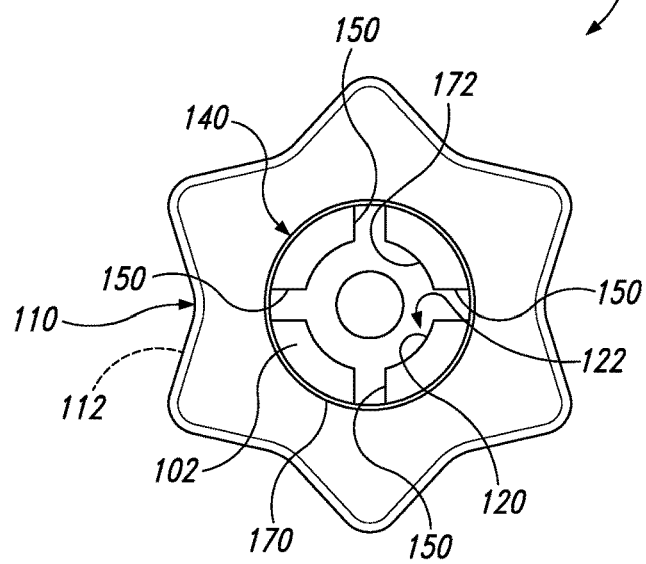
FIG. 6 is an end view of the tool of FIGS. 3-5.
Figure 7:
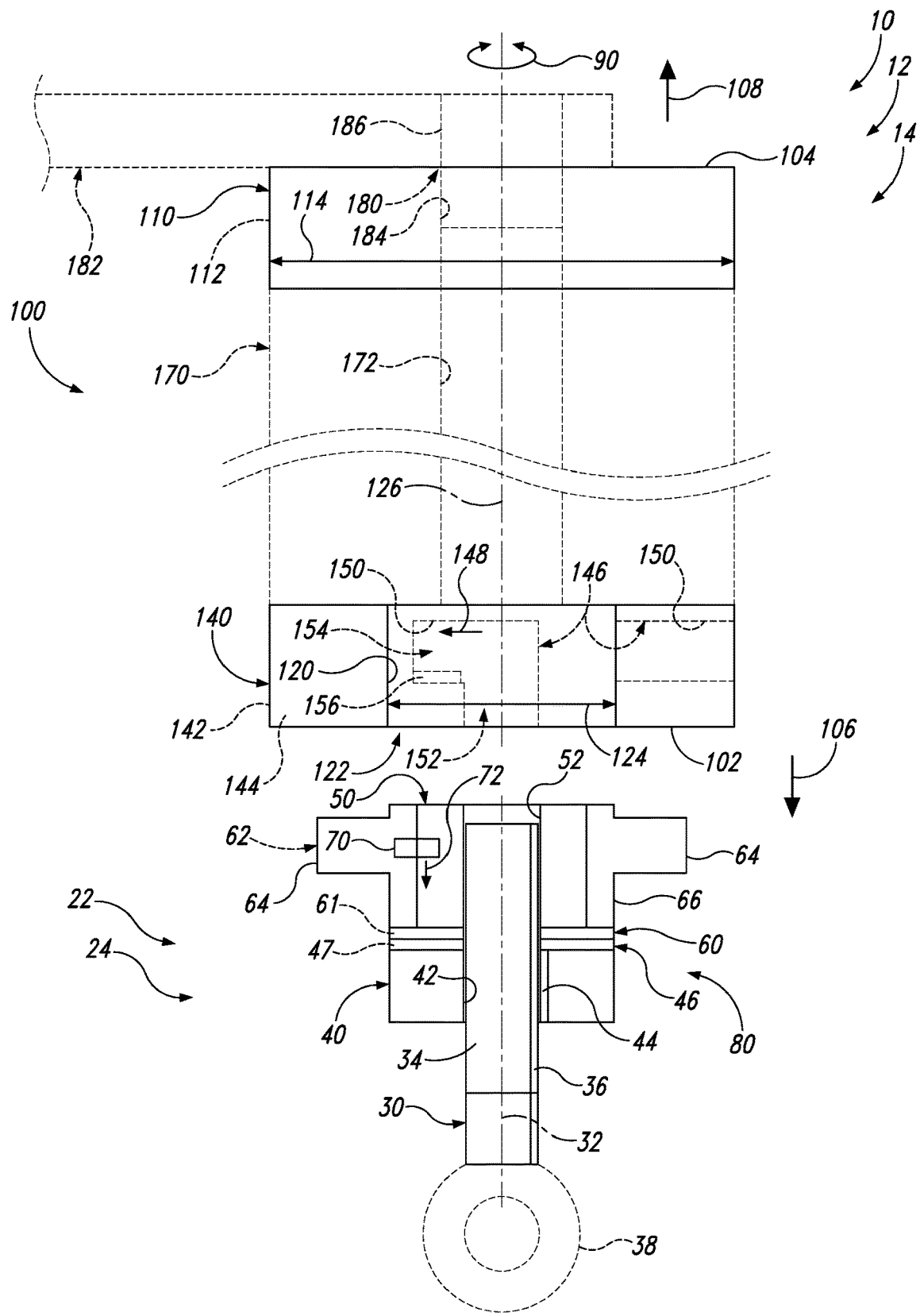
FIG. 7 is a schematic illustration of a tool aligned with a fastener, according to the present disclosure.
Figure 8:
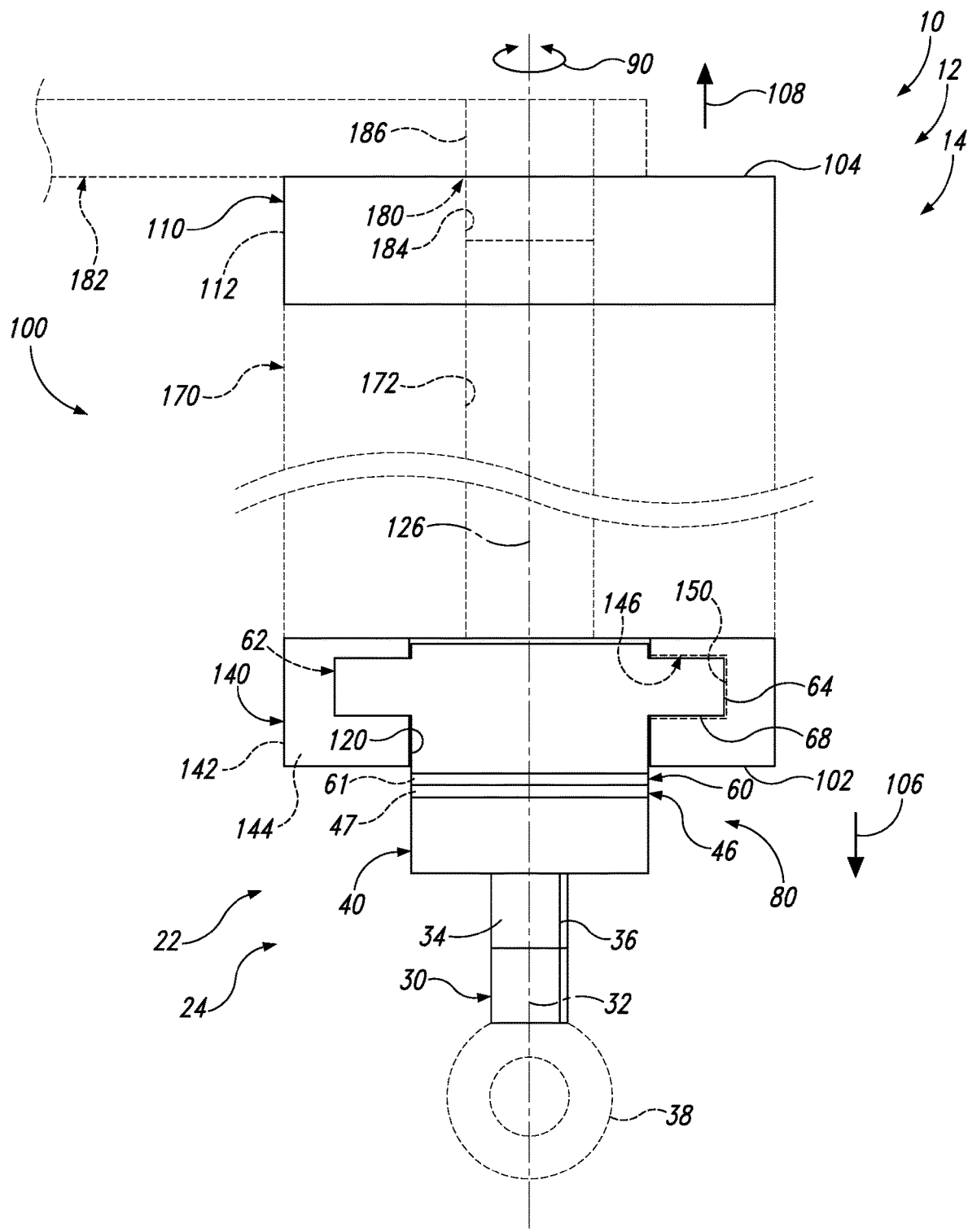
FIG. 8 is a schematic illustration of a tool engaged with a fastener, according to the present disclosure.
Figure 9:
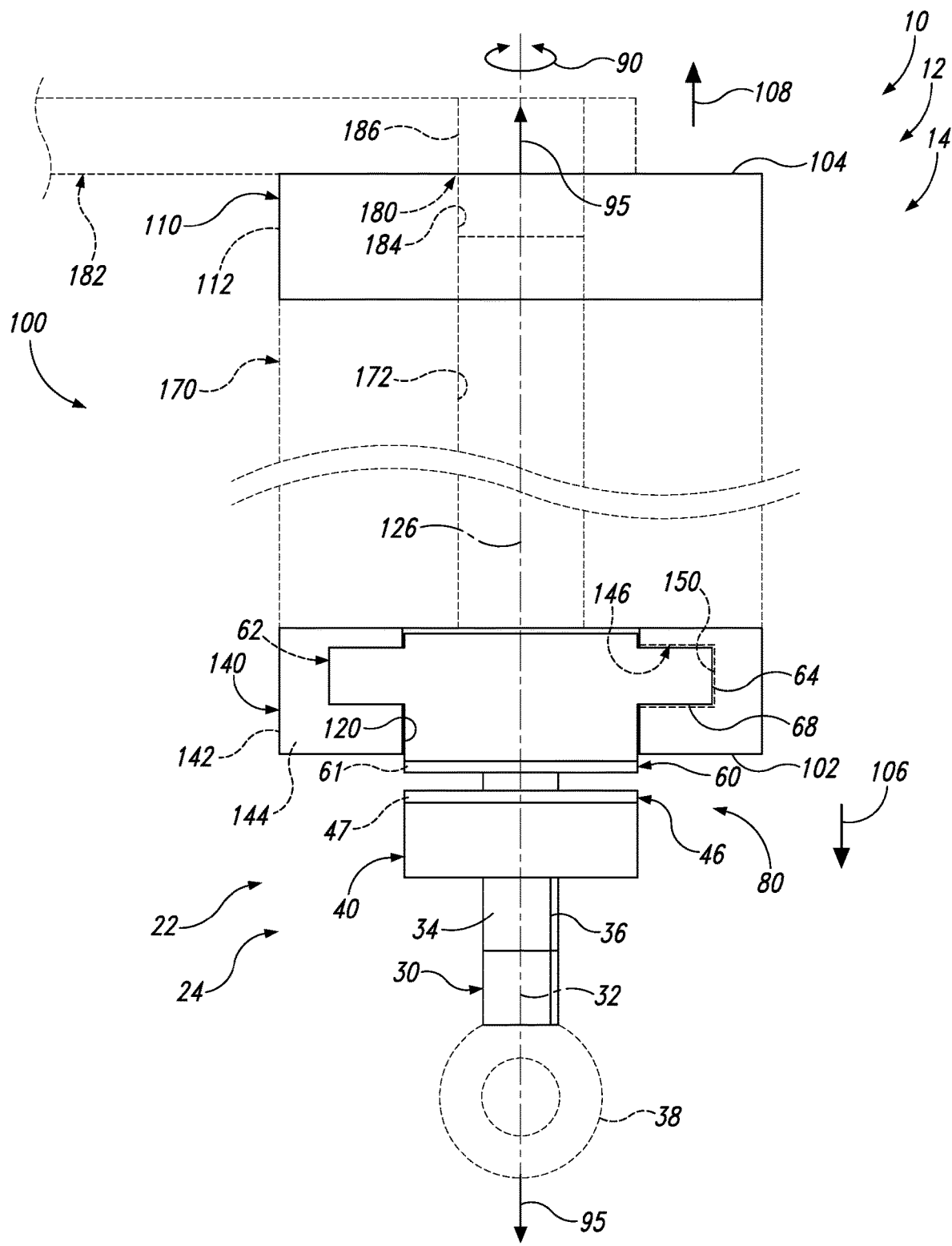
FIG. 9 is a schematic illustration of a tool applying a tensile force to a fastener, according to the present disclosure.

FIG. 3 is a profile view of an example of a tool 100 according to the present disclosure. FIG. 4 is a side view of tool 100 of FIG. 3, FIG. 5 is a cross-sectional view of tool 100 of FIGS. 3-4, and FIG. 6 is an end view of tool 100 of FIGS. 3-5. FIGS. 7-9 schematically illustrate examples of a tool 100 according to the present disclosure. More specifically, FIG. 7 is a schematic illustration of tool 100 aligned with fastener 22, FIG. 8 is a schematic illustration of tool 100 engaged with fastener 22, and FIG. 9 is a schematic illustration of tool 100 applying a tensile force 95 to fastener 22.

As illustrated collectively by FIGS. 3-9, an exemplary tool 100 includes a gripping region 110 that is configured to be gripped by a user of the tool. Gripping region 110 also may be referred to herein as, may include, and/or may be handle 112 of and/or for tool 100. Tool 100 also includes a fastener receptacle 120. Fastener receptacle 120 may be shaped to receive fastener 22, as illustrated in FIGS. 7-9, and includes a fastener-receiving opening 122. Fastener-receiving opening 122 is defined on a fastener-facing side 102 of tool 100, and tool 100 also may define a fastener-opposed side 104 that faces away from fastener-facing side 102. Fastener-facing side 102 may face in a fastener-facing direction 106 and/or may face toward fastener 22 when tool 100 is aligned with fastener 22, such as is illustrated in FIG. 7. In contrast, fastener-opposed side 104 may face in a fastener-opposed direction 108, may face away from fastener-facing side 102, and/or may face away from fastener 22 when tool 100 is aligned with fastener 22. Fastener-receiving opening 122 is sized to permit fastener 22 to enter fastener receptacle 120 from fastener-facing side 102 of tool 100, such as is illustrated by the transition from FIG. 7 to FIG. 8.

Tool 100 further includes an interlock structure 140. Interlock structure 140 is configured to engage and/or to interlock with fastener 22 when the fastener is received within fastener receptacle 120. Interlock structure 140 also is configured to at least selectively and/or temporarily resist and/or prevent motion of tool 100 away from fastener 22 in a fastener-opposed direction 108 that is opposed to fastener-facing side 102 of tool 100. Stated another way, interlock structure 140 may be configured to permit application of a tensile force 95 to fastener 22 by tool 100 and/or to resist separation of tool 100 from fastener 22 during application of tensile force 95, as illustrated in FIG. 9.

During operation and/or utilization of tool 100, such as by the user of the tool, tool 100 may be aligned with fastener 22, as illustrated in FIG. 7. This alignment may include alignment of tool 100, or a central axis 126 thereof, with a bolt elongate axis 32 of fastener 22. Subsequently, and as illustrated by the transition from FIG. 7 to FIG. 8, tool 100 may be translated such that fastener 22 moves through fastener-receiving opening 122 and into fastener receptacle 120. Interlock structure 140 then may be interlocked with fastener 22, and tensile force 95 may be applied to fastener 22 by tool 100. As discussed in more detail herein, application of this tensile force may disengage a locking structure 80 of fastener 22, which may include first and second fastener-locking structures 46 and 60, respectively, thereby permitting tool 100 to loosen and/or tighten fastener 22, such as via rotation of fastener 22 in a rotary direction 90.

Gripping region 110 may include any suitable structure that may be adapted, configured, sized, shaped, and/or constructed to be held and/or gripped by the user of tool 100. This may include holding and/or gripping tool 100 to permit and/or facilitate alignment between tool 100 and fastener 22, as illustrated in FIG. 7, to permit and/or facilitate receipt of fastener 22 into fastener receptacle 122, as illustrated in FIG. 8, to permit and/or facilitate interlocking between interlock structure 140 and fastener 22, as illustrated in FIG. 9, and/or to permit and/or facilitate rotation of tool 100 and/or fastener 22 by the user and/or in rotary direction 90 and/or about central axis 126 of fastener receptacle 120, as illustrated in FIGS. 7-9.

Stated another way, gripping region 110 may be sized and/or shaped to provide a desired amount of leverage for the user of tool 100, such as during rotation of tool 100 and/or fastener 22. With this in mind, an effective diameter 114 of gripping region 110 may be greater than and/or at least a threshold multiple of an effective diameter 124 of fastener receptacle 120, as illustrated in FIG. 7. Effective diameter 114 and/or effective diameter 124 also may be referred to herein as a maximum extent, a maximum dimension, a diameter, and/or an average diameter. Effective diameter 114 and/or effective diameter 124 may be determined and/or measured in a direction that is parallel, or at least substantially parallel, to fastener-facing side 102 of tool 100. Examples of the threshold multiple include threshold multiples of at least 1.25, at least 1.5, at least 1.75, at least 2, at least 2.5, at least 3, at least 4, at least 5, at most 10, at most 8, at most 6, at most 4, at most 3, and/or at most 2. Examples of effective diameter 114 of gripping region 110 include effective diameters of at least 3 centimeters (cm), at least 4 cm, at least 5 cm, at least 6 cm, at least 7 cm, at least 8 cm, at least 9 cm, at least 10 cm, at least 11 cm, at least 12 cm, at most 20 cm, at most 18 cm, at most 16 cm, at most 14 cm, at most 12 cm, at most 10 cm, at most 8 cm, at most 6 cm, and/or at most 4 cm.

Gripping region 110 may have and/or define any suitable shape. As an example, gripping region 110 may be ergonomically shaped, such as to facilitate repeated use of tool 100 by the user. As more specific examples, gripping region 110 may define a circular shape, a T-shape, and/or a star-shape, with the circular and/or T-shapes being represented schematically in FIGS. 7-9 and the star-shape being illustrated in FIGS. 3 and 6.

As illustrated in FIGS. 3-9, gripping region 110 may extend from and/or away from fastener receptacle 120 at least partially in fastener-opposed direction 108. As also illustrated in FIGS. 3-9, central axis 126 of fastener receptacle 120, which extends along fastener-facing direction 106, may extend through at least a portion, a central portion, or even a center, of gripping region 110. Such a configuration may facilitate rotation of fastener 22 with tool 100, as illustrated in FIGS. 7-9 and discussed herein.

Fastener receptacle 120 may include any suitable structure that may be adapted, configured, sized, shaped, and/or constructed to receive fastener 22 and/or that includes fastener-receiving opening 122. As illustrated in FIGS. 7-9, a shape of fastener receptacle 120 may be similar to and/or may correspond to a shape of fastener 22. As examples, and while not required, fastener receptacle 120 may include and/or define a cylindrical, or at least substantially cylindrical, area and/or region. Under these conditions, fastener receptacle 120 may be referred to herein as a cylindrical, or at least partially cylindrical, fastener receptacle.

Interlock structure 140 may include any suitable structure that may be adapted, configured, sized, shaped, and/or constructed to interlock with fastener 22, while the fastener is received within fastener receptacle 120, to prevent motion of the fastener tool away from the fastener, such as in fastener-opposed direction 108, and/or to permit application of tensile force 95 to fastener 22, as illustrated in FIG. 9. As an example, interlock structure 140 may be configured to engage and/or to interlock with fastener 22 such that tool 100 remains engaged with fastener 22 while tensile force 95 is applied to tool 100 in fastener-opposed direction 108. As another example, interlock structure 140 may be configured such that tool 100 is rotated, such as about central axis 126, to engage interlock structure 140 with fastener 22.

As a more specific example, interlock structure 140 may include a tool interlock region 142 that may be configured to operatively engage with a corresponding fastener interlock region 62 of fastener 22, as illustrated in FIGS. 7-9. As another more specific example, and as perhaps best illustrated in FIGS. 4 and 7, interlock structure 140 and/or tool interlock region 142 thereof may include and/or be a slot-defining interlock structure 144 that defines an interlock slot 146. Interlock slot 146 may extend in a slot direction 148 that may be perpendicular, or at least substantially perpendicular, to fastener-facing direction 106.

As yet another more specific example, and as perhaps also best illustrated in FIGS. 3-4 and 7, interlock structure 140 and/or tool interlock region 142 and/or interlock slot 146 thereof may include and/or be an L-shaped slot 150. L-shaped slot 150 may define at least a portion of fastener-receiving opening 122 and may include a longitudinally extending region 152 and an interlocking region 154. Longitudinally extending region 152 may extend from fastener-facing side 102 of tool 100, may extend perpendicular, or at least substantially perpendicular to fastener-facing side 102, and/or may extend in fastener-opposed direction 108. Interlocking region 154 may extend from longitudinally extending region 152, may extend perpendicular, or at least substantially perpendicular, to longitudinally extending region 152, and/or may extend in slot direction 148.

As illustrated in FIGS. 7-9 and discussed herein, tool 100 may include and/or may be utilized with fastener 22. An example of fastener 22 includes swing bolt 24, which also may be referred to herein as an avionics swing bolt. As perhaps best illustrated in FIG. 7, fastener 22, such as a swing bolt 24, may include a bolt 30, a bushing 40, a nut 50, first and second fastener-locking structures 46/60, and/or a biasing mechanism 70.

Bolt 30 includes a male threaded region 34 that extends along bolt elongate axis 32. Bolt 30 also includes a first rotation-resisting structure 36. Bolt 30 also may be referred to herein as an elongate bolt that extends along bolt elongate axis 32. As illustrated in dashed lines in FIG. 7, bolt 30 also may include an eye region 38, such as may permit rotary attachment of bolt 30 to vehicle 10. Under these conditions, bolt 30 also may be referred to herein as an eye bolt.

Bushing 40 includes a central bushing opening 42, a second rotation-resisting structure 44, and first fastener-locking structure 46. Male threaded region 34 of bolt 30 is received within central bushing opening 42 such that bushing 40 is configured to translate and/or slide along at least a portion of a length of bolt 30 (e.g., along bolt elongate axis 32). First rotation-resisting structure 36 and second rotation-resisting structure 44 permit this translational motion but may resist rotation of bushing 40 relative to bolt 30 and/or about bolt elongate axis 32.

Nut 50 includes a threaded central nut opening 52. Threaded central nut opening 52 is shaped for threaded engagement with male threaded region 34 of bolt 30, and is threaded onto male threaded region 34.

Second fastener-locking structure 60 is attached to nut 50 and includes a plurality of projecting regions 64. Projecting regions 64 project from second fastener locking structure 60, such as in a direction that is perpendicular, or at least substantially perpendicular, to bolt elongate axis 32 and may be referred to herein as forming, defining, and/or being fastener interlock region 62. Second fastener-locking structure 60 is operatively interlocked with nut 50 in rotary direction 90. In addition, second fastener-locking structure 60 is configured to limited translational motion relative to nut 50 along bolt elongate axis 32.

The plurality of projecting regions 64 may include any suitable number of projecting regions 64. As examples, the plurality of projecting regions 64 may include at least 2, at least 3, at least 4, at least 5, at least 6, at most 10, at most 8, at most 6, and/or at most 4 projecting regions 64. The plurality of projecting regions may be spaced-apart, equally spaced-apart, and/or equally rotationally spaced-apart about an external periphery of second fastener-locking structure 60.

Biasing mechanism 70 is configured to apply a biasing force 72 that urges second fastener-locking structure 60 toward and/or into contact with first fastener-locking structure 46. This contact may be such that second fastener-locking structure 60 operatively engages with first fastener-locking structure 46 and at last selectively resists rotation of nut 50 relative to bolt 30. However, and as illustrated in FIG. 9, fastener 22 also is configured such that application of tensile force 95 with greater than a threshold magnitude, to second fastener-locking structure 60 and in a direction that is away from bushing 40 (e.g., in fastener-opposed direction 108), overcomes biasing force 72 applied by biasing mechanism 70 and disengages second fastener-locking structure 60 from first fastener-locking structure 46. When first fastener-locking structure 46 and second fastener-locking structure 60 are disengaged from one another, nut 50 may be free to rotate relative to bolt 30 in rotary direction 90 and/or about bolt elongate axis 32 (i.e., such as in a tightening direction, which threads nut 50 onto bolt 30, and/or in a loosening direction, which threads nut 50 off of bolt 30).

First fastener-locking structure 46 and/or second fastener-locking structure 60 may include any suitable structure that may, at least temporarily and/or selectively, resist rotation of nut 50 relative to bolt 30. As an example, first fastener-locking structure 46 may include a first plurality of locking teeth 47. Similarly, second fastener-locking structure 60 may include a second plurality of locking teeth 61. Second plurality of locking teeth 61 may be shaped to interlock with first plurality of locking teeth 47.

It is within the scope of the present disclosure that, when first fastener-locking structure 46 and second fastener-locking structure 60 are interlocked with one another, fastener 22 may resist rotation of bolt 30 relative to bushing 40 in both the tightening direction and in the loosening direction. Alternatively, it is also within the scope of the present disclosure that first fastener-locking structure 46 and second fastener-locking structure 60 together may be configured to permit relative rotation in the tightening direction but not in the loosening direction. Such a configuration may permit tightening of nut 50 without application of tensile force 95 by tool 100 but may resist loosening of nut 50 unless tensile force 95 is applied to fastener 22 by tool 100, thereby disengaging first fastener-locking structure 46 and second fastener-locking structure 60, as illustrated in FIG. 9.

When fastener 22 includes the plurality of projecting regions 64, interlock structure 140 of tool 100 may be configured to operatively engage, or interlock with, at least a subset, or even all, of the plurality of projecting regions 64. As an example, and as illustrated in FIGS. 8-9, interlock structure 140 may extend around and/or engage with at least a bushing-facing surface 68 of projecting regions 64. As additional and/or alternative examples, interlock structure 140 may extend around, interlock with, and/or directly contact at least one, at least two, and/or at least three sides of each projecting region 64.

As illustrated in dashed lines in FIG. 7, tool 100 and/or interlock structure 140 thereof may include a retention structure 156. Retention structure 156, when present, may be configured to resist separation of at least a portion of fastener 22, such as fastener interlock region 62 and/or projecting regions 64 thereof, from tool 100 subsequent to interlock structure 140 being interlocked with fastener 22. Examples of retention structure 156 include a tab, a projecting, and/or a tapered region configured to engage with a corresponding portion, or region, of fastener 22.

As illustrated in solid lines in FIGS. 3-6 and in dashed lines in FIGS. 7-9, tool 100 may include an elongate shaft 170 that extends between gripping region 110 and fastener receptacle 120. Stated another way, elongate shaft 170 may extend from fastener receptacle 120 and/or from fastener-facing side 102 in fastener-opposed direction 108. Additionally or alternatively, elongate shaft 170 may extend from gripping region 110 in fastener-facing direction 106.

Elongate shaft 170, when present, may have and/or define any suitable length, or shaft length, which may be measured between gripping region 110 and fastener-facing side 102 of tool 100. Examples of the shaft length include shaft lengths of at least 4 centimeters (cm), at least 6 cm, at least 8 cm, at least 10 cm, at least 12 cm, at least 14 cm, at most 20 cm, at most 18 cm, at most 16 cm, at most 14 cm, at most 12 cm, at most 10 cm, at most 8 cm, and/or at most 6 cm.

As illustrated in solid lines in FIGS. 3 and 5-6 and dashed lines in FIGS. 7-9, tool 100 and/or elongate shaft 170 thereof further may include a bolt opening 172. Bolt opening 172, when present, may extend in fastener-opposed direction 108 from fastener receptacle 120 and may be sized to receive at least a portion, or region, of bolt 30 of fastener 22.

As illustrated in dashed lines in FIGS. 7-9, tool 100 also may include a leverage-enhancing structure 180. Leverage-enhancing structure 180, when present, may be configured to operatively interlock with a leverage-enhancing tool 182. Leverage-enhancing tool 182, when utilized, may be separate and/or distinct from tool 100 and may permit the user to apply additional leverage, or a predetermined amount of leverage, or torque, to tool 100 during utilization of tool 100 to tighten and/or loosen fasteners 22. Examples of leverage-enhancing structure 180 include a leverage-enhancing recess 184 that extends into tool 100 and/or a leverage-enhancing projection 186 that projects from tool 100. Examples of leverage-enhancing tool 182 include a ratchet wrench, a torque wrench, a wrench, a plier, a combination wrench, an adjustable wrench, and/or a box wrench.

Tool 100 also may be referred to herein as and/or may be a fastener removal tool, a swing bolt tool, an avionics swing bolt tool, and/or a swing bolt removal tool. It is within the scope of the present disclosure that tool 100 may be a monolithic tool and/or a unitary tool that defines a fixed relative orientation among at least gripping region 110, fastener receptacle 120, and interlock structure 140. Tool 100 may be formed and/or defined via any suitable machining operation, subtractive manufacturing process, and/or additive manufacturing process.

Figure 10:
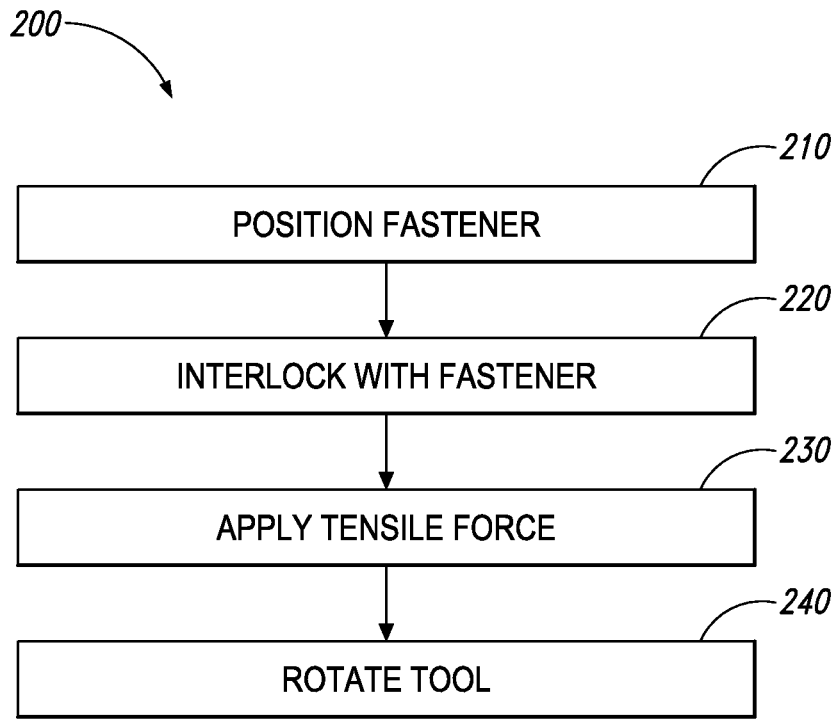
FIG. 10 is a flowchart depicting methods of utilizing a tool, according to the present disclosure.

FIG. 10 is a flowchart depicting methods 200 of utilizing a tool, according to the present disclosure, such as tool 100 of FIGS. 3-9. Methods 200 include positioning a fastener at 210, interlocking an interlock structure of the tool with the fastener at 220, applying a tensile force at 230, and rotating the tool at 240.

The positioning at 210 may include positioning the fastener within a fastener receptacle, such as fastener receptacle 120 of FIGS. 3-9, of the tool. The positioning at 210 may include aligning a fastener-receiving opening of the tool, such as fastener-receiving opening 122 of FIGS. 3-9, with the fastener. The positioning at 210 also may include translating a fastener-facing side of the tool, such as fastener-facing side 102 of FIGS. 3-9, in a fastener-facing direction, such as fastener-facing direction 106 of FIGS. 3-9, such that the fastener moves through the fastener-receiving opening and into the fastener receptacle.

The interlocking at 220 may include interlocking to permit and/or facilitate the applying at 230. The interlocking at 220 may be accomplished in any suitable manner. As an example, the interlocking at 220 may include rotating the tool relative to the fastener to interlock the interlock structure of the tool, such as interlock structure 140 of FIGS. 3-9, with the fastener and/or to capture at least a portion of the fastener with and/or within the interlock structure of the tool. As another example, the interlocking at 220 may include operatively engaging the interlock structure with the fastener and/or with at least a subset of a plurality of projecting regions of the fastener. Examples of the projecting regions are illustrated in FIGS. 7-9 at 64.

The applying at 230 may include applying the tensile force, such as tensile force 95 of FIG. 9, in a direction that is away from the fastener-facing side of the tool. This may include applying the tensile force to disengage a locking structure of the fastener, such as locking structure 80 of FIGS. 7-9. This disengagement is illustrated by the transition from FIG. 8 to FIG. 9, with FIG. 8 illustrating engagement between first fastener-locking structure 46 and second fastener-locking structure 60 of locking structure 80 and FIG. 9 illustrating disengagement between the first fastener-locking structure and the second fastener-locking structure.

The rotating at 240 may include rotating the tool about an axis of rotation, such as central axis 126 of FIGS. 7-9, to loosen and/or tighten the fastener. When methods 200 are utilized to loosen the fastener, the rotating at 240 may be performed during, or concurrently with, the applying at 230 and/or the rotating at 240 may include rotating in a loosening direction.

Figure 11:
FIG. 11 is a flowchart depicting methods of forming a tool, according to the present disclosure.

FIG. 11 is a flowchart depicting methods 250 of forming a tool, according to the present disclosure, such as tool 100 of FIGS. 3-9. Methods 250 include utilizing, at 260, an additive manufacturing process to form at least the gripping region, the fastener receptacle, and the interlock structure of the tool.

Illustrative, non-exclusive examples of inventive subject matter according to the present disclosure are described in the following enumerated paragraphs:

A1. A tool configured to rotate a fastener, the tool comprising:

a gripping region configured to be gripped by a user of the tool;

a fastener receptacle shaped to receive the fastener, wherein the fastener receptacle includes a fastener-receiving opening defined on a fastener-facing side of the tool that faces in a fastener-facing direction, wherein the fastener-receiving opening is sized to permit the fastener to enter the fastener receptacle from the fastener-facing side of the tool; and an interlock structure configured to interlock with the fastener, while the fastener is received within the fastener receptacle, and to prevent motion of the tool, away from the fastener, in a fastener-opposed direction that is opposed to the fastener-facing side of the tool.

A2. The tool of paragraph A1, wherein the interlock structure is configured to interlock with the fastener such that the tool remains engaged with the fastener while the user applies a tensile force to the tool in the fastener-opposed direction.

A3. The tool of any of paragraphs A1-A2, wherein the interlock structure includes a tool interlock region configured to operatively engage with a corresponding fastener interlock region of the fastener to prevent motion of the tool away from the fastener in the fastener-opposed direction.

A4. The tool of any of paragraphs A1-A3, wherein the interlock structure includes a slot-defining interlock structure that defines an interlock slot that extends in a slot direction that is at least substantially perpendicular to the fastener-facing direction.

A5. The tool of any of paragraphs A1-A4, wherein the interlock structure includes an L-shaped slot.

A6. The tool of paragraph A5, wherein the L-shaped slot defines at least a portion of the fastener-receiving opening and includes a longitudinally extending region, which extends perpendicular, or at least substantially perpendicular, to the fastener-facing side of the tool, and an interlocking region, which extends perpendicular, or at least substantially perpendicular, to the longitudinally extending region.

A7. The tool of any of paragraphs A1-A6, wherein the interlock structure is configured such that the tool is rotated to engage the interlock structure with the fastener.

A8. The tool of any of paragraphs A1-A7, wherein the tool includes the fastener.

A9. The tool of any of paragraphs A1-A8, wherein the fastener includes a swing bolt.

A10. The tool of any of paragraphs A1-A9, wherein the fastener includes at least one of:

a bolt including a male threaded region, which extends along a bolt elongate axis, and a first rotation-resisting structure;

a bushing including a central bushing opening, a second rotation-resisting structure, and a first fastener-locking structure, wherein the male threaded region is received within the central bushing opening, and further wherein the first rotation-resisting structure and the second rotation-resisting structure together permit translation of the bushing along the bolt elongate axis and resist rotation of the bushing, relative to the bolt, about the bolt elongate axis;

a nut including a threaded central nut opening that is threaded onto the male threaded region of the bolt;

a second fastener-locking structure attached to the nut and including a plurality of projecting regions that project, from the second fastener-locking structure, in a direction that is perpendicular, or at least substantially perpendicular, to the bolt elongate axis, optionally to define a/the fastener interlock region, wherein the second fastener-locking structure is operatively interlocked with the nut in a rotary direction that rotates about the bolt elongate axis and is configured for limited translational motion, relative to the nut, along the bolt elongate axis; and a biasing mechanism configured to apply a biasing force that urges the second fastener-locking structure into contact with the first fastener-locking structure such that the second fastener-locking structure operatively engages with the first fastener-locking structure and resists rotation of the nut relative to the bolt.

A11. The tool of paragraph A10, wherein the bolt is an eye bolt that further includes an eye region.

A12. The tool of paragraph A11, wherein the eye region is operatively attached to a vehicle, optionally wherein the vehicle includes an aircraft, and further optionally wherein the fastener is in combination with the vehicle.

A13. The tool of any of paragraphs A10-A12, wherein the plurality of projecting regions includes four projecting regions.

A14. The tool of any of paragraphs A10-A13, wherein the plurality of projecting regions is equally rotationally spaced about an external periphery of the second fastener-locking structure.

A15. The tool of any of paragraphs A10-A14, wherein the first fastener-locking structure includes a first plurality of locking teeth, and further wherein the second fastener-locking structure includes a second plurality of locking teeth shaped to interlock with the first plurality of locking teeth.

A16. The tool of any of paragraphs A10-A15, wherein the first fastener-locking structure and the second fastener-locking structure together are configured to permit relative rotation therebetween in a tightening direction, which threads the nut onto the bolt, and to resist relative rotation therebetween in a loosening direction, which threads the nut off of the bolt.

A17. The tool of any of paragraphs A10-A16, wherein the fastener is configured such that a tensile force of greater than a threshold magnitude, which is applied to the second fastener-locking structure in a direction that is away from the bushing, overcomes the biasing force and disengages the second fastener-locking structure from the first fastener-locking structure.

A18. The tool of paragraph A17, wherein, when the first fastener-locking structure is disengaged from the second fastener-locking structure, the nut is free to rotate, relative to the bolt, in both a/the tightening direction and a/the loosening direction.

A19. The tool of any of paragraphs A10-A18, wherein the interlock structure is configured to operatively engage with at least a subset, and optionally all, of the plurality of projecting regions.

A20. The tool of any of paragraphs A10-A19, wherein the interlock structure extends around a bushing-facing surface of at least a/the subset of the plurality of projecting regions.

A21. The tool of any of paragraphs A10-A20, wherein the interlock structure is configured to directly contact at least two, or at least three, sides of each of a/the subset of the plurality of projecting regions.

A22. The tool of any of paragraphs A1-A21, wherein the interlock structure further includes a retention structure configured to resist separation of at least a portion of the fastener from the tool.

A23. The tool of paragraph A22, wherein the retention structure includes at least one of a tab, a projection, and a tapered region configured to engage with at least a corresponding portion of the fastener to resist separation of a/the portion of the fastener from the tool.

A24. The tool of any of paragraphs A1-A23, wherein a shape of the fastener receptacle corresponds to a shape of the fastener.

A25. The tool of any of paragraphs A1-A24, wherein the fastener receptacle includes a cylindrical, or at least substantially cylindrical, region.

A26. The tool of any of paragraphs A1-A25, wherein the gripping region is sized to provide a desired amount of leverage for the user of the tool.

A27. The tool of any of paragraphs A1-A26, wherein an effective diameter of the gripping region, optionally as measured in a direction that is at least substantially parallel to the fastener-facing side of the tool, is a threshold multiple of an effective diameter of the fastener receptacle, optionally as measured in the direction that is at least substantially parallel to the fastener-facing side of the tool.

A28. The tool of paragraph A27, wherein the threshold multiple is at least 1.25, at least 1.5, at least 1.75, at least 2, at least 2.5, at least 3, at least 4, at least 5, at most 10, at most 8, at most 6, at most 4, at most 3, and/or at most 2.

A29. The tool of any of paragraphs A1-A28, wherein an/the effective diameter of the gripping region is at least 3 centimeters (cm), at least 4 cm, at least 5 cm, at least 6 cm, at least 7 cm, at least 8 cm, at least 9 cm, at least 10 cm, at least 11 cm, at least 12 cm, at most 20 cm, at most 18 cm, at most 16 cm, at most 14 cm, at most 12 cm, at most 10 cm, at most 8 cm, at most 6 cm, and/or at most 4 cm.

A30. The tool of any of paragraphs A1-A29, wherein the gripping region includes a handle.

A31. The tool of any of paragraphs A1-A30, wherein the gripping region defines at least one of:
(i) a circular shape;
(ii) a star-shape; and
(iii) a T-shape.

A32. The tool of any of paragraphs A1-A31, wherein the gripping region is ergonomically shaped.

A33. The tool of any of paragraphs A1-A32, wherein the gripping region extends, from the fastener receptacle, at least partially in the fastener-opposed direction.

A34. The tool of any of paragraphs A1-A33, wherein a central axis of the fastener receptacle, which extends along the fastener-facing direction, extends through at least a portion of the gripping region.

A35. The tool of any of paragraphs A1-A34, wherein the tool further includes an elongate shaft extending between the gripping region and the fastener receptacle.

A36. The tool of paragraph A35, wherein a shaft length of the elongate shaft, as measured between the gripping region and the fastener-facing side of the tool, is at least 4 cm, at least 6 cm, at least 8 cm, at least 10 cm, at least 12 cm, at least 14 cm, at most 20 cm, at most 18 cm, at most 16 cm, at most 14 cm, at most 12 cm, at most 10 cm, at most 8 cm, and/or at most 6 cm.

A37. The tool of any of paragraphs A35-A36, wherein the elongate shaft extends, from the fastener receptacle, in the fastener-opposed direction.

A38. The tool of any of paragraphs A1-A37, wherein the tool further includes a bolt opening that extends from the fastener receptacle in the fastener-opposed direction, wherein the bolt opening is sized to receive a/the bolt of the fastener.

A39. The tool of any of paragraphs A1-A38, wherein the tool further includes a leverage-enhancing structure configured to operatively interlock with a leverage-enhancing tool, which is distinct from the tool.

A40. The tool of paragraph A39, wherein the tool includes the leverage-enhancing tool.

A41. The tool of any of paragraphs A39-A40, wherein the leverage-enhancing structure includes at least one of:
(i) a leverage-enhancing recess that extends into the tool; and
(ii) a leverage-enhancing projection that projects from the tool.

A42. The tool of any of paragraphs A39-A41, wherein the leverage-enhancing tool includes at least one of a ratchet wrench, a torque wrench, a wrench, a plier, an adjustable wrench, a combination wrench, and a box end wrench.

A43. The tool of any of paragraphs A1-A42, wherein the tool includes, or instead is, at least one of a fastener removal tool and a swing bolt removal tool.

A44. The tool of any of paragraphs A1-A43, wherein the tool is at least one of:
(i) a monolithic tool; and
(ii) a unitary tool.

A45. The tool of any of paragraphs A1-A44, wherein the tool is formed via an additive manufacturing process.

A46. The tool of any of paragraphs A1-A45, wherein the tool defines a fixed relative orientation among at least the gripping region, the fastener receptacle, and the interlock structure.

B1. A method of utilizing the tool of any of paragraphs A1-A46, the method comprising: positioning the fastener within the fastener receptacle, wherein the positioning includes:
(i) aligning the fastener-receiving opening with the fastener; and
(ii) translating the fastener-facing side of the tool in the fastener-facing direction such that the fastener moves through the fastener-receiving opening and into the fastener receptacle;
interlocking the interlock structure with the fastener;
applying the tensile force, which is directed away from the fastener-facing side of the tool, to the tool to disengage a locking structure of the fastener; and
during the applying the tensile force, rotating the tool about an axis of rotation.

B2. The method of paragraph B1, wherein the interlocking includes rotating the tool relative to the fastener.

B3. The method of any of paragraphs B1-B2, wherein the interlocking includes operatively engaging the interlock structure with the fastener, and optionally with a/the subset of a/the plurality of projecting regions of the fastener.

C1. A method of forming the tool of any of paragraphs A1-A46, the method comprising:
utilizing an additive manufacturing process to form at least the gripping region, the fastener receptacle, and the interlock structure of the tool.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A tool configured to rotate a fastener, the tool comprising:
   a gripping region configured to be gripped by a user of the tool;
   a fastener receptacle shaped to receive the fastener, wherein the fastener receptacle includes a fastener-receiving opening defined on a fastener-facing side of the tool that faces in a fastener-facing direction, wherein the fastener-receiving opening is sized to permit the fastener to enter the fastener receptacle from the fastener-facing side of the tool;
   a bolt opening that extends from the fastener receptacle in a fastener-opposed direction that is opposed to the fastener-facing side of the tool, wherein the bolt opening is sized to receive a bolt of the fastener; and
   an interlock structure configured to interlock with the fastener, while the fastener is received within the fastener receptacle, and to prevent motion of the tool, away from the fastener, in the fastener-opposed direction.

2. The tool of claim 1, wherein the interlock structure is configured to interlock with the fastener such that the tool remains engaged with the fastener while the user applies a tensile force to the tool in the fastener-opposed direction.

3. The tool of claim 1, wherein the interlock structure includes a slot-defining interlock structure that defines an interlock slot that extends in a slot direction that is at least substantially perpendicular to the fastener-facing direction.

4. The tool of claim 1, wherein the interlock structure includes an L-shaped slot.

5. The tool of claim 4, wherein the L-shaped slot defines at least a portion of the fastener-receiving opening and includes a longitudinally extending region, which extends perpendicular, or at least substantially perpendicular, to the fastener-facing side of the tool, and an interlocking region, which extends perpendicular, or at least substantially perpendicular, to the longitudinally extending region.

6. The tool of claim 1, wherein the interlock structure is configured such that the tool is rotated to engage the interlock structure with the fastener.

7. The tool of claim 1, wherein the interlock structure further includes a retention structure configured to resist separation of at least a portion of the fastener from the tool.

8. The tool of claim 1, wherein a shape of the fastener receptacle corresponds to a shape of the fastener.

9. The tool of claim 1, wherein the gripping region is sized to provide a desired amount of leverage for the user of the tool, wherein an effective diameter of the gripping region is at least 2 times an effective diameter of the fastener receptacle.

10. The tool of claim 1, wherein the gripping region extends, from the fastener receptacle, at least partially in the fastener-opposed direction.

11. The tool of claim 1, wherein the tool further includes an elongate shaft extending between the gripping region and the fastener receptacle.

12. The tool of claim 11, wherein the elongate shaft extends, from the fastener receptacle, in the fastener-opposed direction.

13. The tool of claim 1, wherein the tool further includes a leverage-enhancing structure configured to operatively interlock with a leverage-enhancing tool, which is distinct from the tool.

14. The tool of claim 13, wherein the leverage-enhancing structure includes at least one of:
   (i) a leverage-enhancing recess that extends into the tool; and
   (ii) a leverage-enhancing projection that projects from the tool.

15. The tool of claim 1, wherein the tool is at least one of:
   (i) a monolithic tool; and
   (ii) a unitary tool.

16. A method of forming the tool of claim 1, the method comprising:

utilizing an additive manufacturing process to form at least the gripping region, the fastener receptacle, and the interlock structure of the tool.

17. A method of utilizing the tool of claim 1, the method comprising:
    positioning the fastener within the fastener receptacle, wherein the positioning includes:
    (i) aligning the fastener-receiving opening with the fastener; and
    (ii) translating the fastener-facing side of the tool in the fastener-facing direction such that the fastener moves through the fastener-receiving opening and into the fastener receptacle;
    interlocking the interlock structure with the fastener;
    applying a tensile force, which is directed away from the fastener-facing side of the tool, to the tool to disengage a locking structure of the fastener; and
    during the applying the tensile force, rotating the tool about an axis of rotation.

18. A method of utilizing a tool to rotate a fastener, the method comprising:
    positioning the fastener within a fastener receptacle of the tool, wherein the fastener receptacle is shaped to receive the fastener and includes a fastener-receiving opening defined on a fastener-facing side of the tool, wherein the fastener-facing side faces in a fastener-facing direction, and further wherein the fastener-receiving opening is sized to permit the fastener to enter the fastener receptacle from the fastener-facing side of the tool, wherein the positioning includes:
    (i) aligning the fastener-receiving opening with the fastener; and
    (ii) translating the fastener-facing side of the tool in the fastener-facing direction such that the fastener moves through the fastener-receiving opening and into the fastener receptacle;
    interlocking an interlock structure of the tool with the fastener while the fastener is received within the fastener receptacle, wherein, subsequent to the interlocking, the interlock structure prevents motion of the tool away from the fastener in a fastener-opposed direction that is opposed to the fastener-facing direction;
    subsequent to the interlocking, applying a tensile force, which is directed in the fastener-opposed direction, to the tool to disengage a locking structure of the fastener; and
    during the applying the tensile force, rotating the tool about an axis of rotation to rotate the fastener.

19. The method of claim 18, wherein the interlocking includes rotating the tool relative to the fastener.

20. The method of claim 18, wherein the interlocking includes operatively engaging the interlock structure with a plurality of projecting regions of the fastener.

* * * * *